United States Patent [19]

Messenger

[11] 4,124,075

[45] Nov. 7, 1978

[54] USE OF OIL-WETTING SPACERS IN CEMENTING AGAINST EVAPORITES

[75] Inventor: Joseph U. Messenger, Dallas, Tex.

[73] Assignee: Mobil Oil Corporation, New York, N.Y.

[21] Appl. No.: 861,756

[22] Filed: Dec. 19, 1977

[51] Int. Cl.² ............................................. E21B 33/14
[52] U.S. Cl. ..................................... 166/293; 106/90; 166/291
[58] Field of Search ....................... 166/291, 292, 293; 106/89, 90; 175/65

[56] References Cited

U.S. PATENT DOCUMENTS

| 2,238,930 | 4/1941 | Chamberlain et al. | 166/292 |
| 3,071,481 | 1/1963 | Beach et al. | 106/90 |
| 3,197,317 | 7/1965 | Patchen | 166/292 |
| 3,375,869 | 4/1968 | Messenger | 166/292 X |
| 3,396,105 | 8/1968 | Burdyn et al. | 252/8.5 P |
| 3,411,580 | 11/1968 | McKinney et al. | 166/285 |
| 3,467,193 | 9/1969 | Messenger | 166/292 |
| 3,688,845 | 9/1972 | Messenger | 166/291 |
| 3,806,571 | 4/1974 | Rönnmark et al. | 106/89 X |
| 3,937,282 | 2/1976 | Shryock et al. | 166/293 |
| 3,976,494 | 8/1976 | Kudo et al. | 106/90 X |

Primary Examiner—Stephen L. Novosad
Assistant Examiner—George A. Suchfield
Attorney, Agent, or Firm—C. A. Huggett; Henry L. Ehrlich

[57] ABSTRACT

This specification discloses a method of cementing pipe in a well and discloses the use of a designed oil-wetting liquid and cement slurry for cementing pipe against evaporite sections penetrated by the well. The cement slurry is formulated from hydraulic cement, silica flour, ionization control agent, sodium chloride, weighting agent, dispersing and retarding agent, and water, and has a density within the range of about 15.8 to 21.0 pounds per gallon.

10 Claims, No Drawings

USE OF OIL-WETTING SPACERS IN CEMENTING AGAINST EVAPORITES

BACKGROUND OF THE INVENTION

This invention relates to cementing pipe in a well drilled into the earth and more particularly is related to cementing pipe against evaporite sections penetrated by the well.

In the completion of a well drilled into the earth, pipe or casing is normally lowered into the well and a cement slurry is pumped down the well and up the annular space formed between the pipe and the wall of the well. The cement slurry is then maintained in the annular space to allow it to set and bond with the pipe and the wall of the well to thereby hold the pipe in place and to prevent fluids from flowing behind the pipe. Many different cements and cement slurries have been used for this purpose though portland cement and calcium aluminate cement are probably the most commonly used cements. Various additives and formulations have been used with these cements in forming slurries having particularly desirable properties. For example, clays selected from the group of bentonite and attapulgite have been added to cement slurries as have sodium chloride, calcium chloride, dispersing agents, and gypsum.

In U.S. Pat. No. 3,937,282 to Stanley H. Shryock et al., there is described a composition for cementing casing in wells drilled through permafrost zones. The Shryock et al. slurry consists essentially of a hydraulic cement, gypsum, a monovalent chloride salt, and a setting time retarding agent and water. In U.S. Pat. No. 3,071,481 to Horace J. Beach et al. there is described a gel cement composition for use in cementing wells. This composition consists essentially of a hydraulic cement, a colloidal clay, sodium chloride or calcium chloride, and an organic dispersing agent. In U.S. Pat. No. 3,467,193 to Joseph U. Messenger, there is described still another cement composition for use in cementing wells. This cement composition describes the use in a slurry of hydraulic cement of a turbulence inducer and silica or diatomaceous earth particles having sizes of from 0.1 to about 44 microns in diameter. In copending U.S. application Ser. No. 714,713, CEMENTING AGAINST EVAPORITES, filed Aug. 6, 1976, now U.S. Pat. No. 4,089,376 by Joseph U. Messenger, there is described a method of cementing pipe against an evaporite section wherein there is used a cement slurry formulated from hydraulic cement silica flour, attapulgite, sodium chloride, weighting agent, dispersing and retarding agent, and water to have a density within the range of 13.0 to 21.0 pounds per gallon.

In the placing of cement slurries in a well, preflush solutions, washer or spacer solutions are often used intermediate the cement slurry and the drilling mud located in the well to prevent the contamination of the slurry by drilling mud and filter cake formed therefrom. For example, in U.S. Pat. No. 3,291,211 to Joseph G. Savins et al., there is described for this purpose a solvent containing a dissolved solute which imparts viscoelastic properties to the liquid. In U.S. Pat. No. 3,348,612 to Joseph U. Messenger, a slug of liquid having mutual solubility for oil and water is used ahead of a cement slurry. In U.S. Pat. No. 3,467,193 to Joseph U. Messenger, there is used a preflush comprised of formation water containing dispersants. In U.S. Pat. No. 3,688,845 to Joseph U. Messenger, there is described a preflush solution for use in a well having an oil base drilling mud therein which preflush solution is comprised of an oil and a dispersant and has a lower viscosity and a lower gel strength than the drilling mud. In U.S. Pat. No. 3,411,580 to Oscar B. McKinney et al., there is described a preflush solution that is comprised of water, a polysaccharide, and a cross-linking agent. In U.S. Pat. No. 3,884,302 to Joseph U. Messenger, there is flowed ahead of a cement slurry an aqueous alkaline wash having a pH of at least 10 followed by an aqueous preflush having a characteristic of forming a viscous film upon contact with a fluid having a pH of at least 10.

SUMMARY OF THE INVENTION

This invention is directed to a method of cementing pipe against an evaporite section in a well penetrating the earth and having a water base drilling mud therein. An oil-wetting liquid is flowed through the annular space formed intermediate the pipe and the wall of the well to oil-wet the evaporite section. Thereafter, a pumpable cement slurry is formed comprised of hydraulic cement, sodium chloride in an amount of at least about 18 weight percent based on mixing water, an ionization control agent in an amount up to 1.5 weight percent based on cement, mixing water, and weighting agent in an amount to provide a density of said cement slurry within the range of about 15.8 to 21 pounds per gallon. This cement slurry is positioned in the annular space formed intermediate the pipe and the evaporite section and there maintained and allowed to set and bond the pipe to the oil-wet evaporite section.

DESCRIPTION OF THE PREFERRED EMBODIMENTS

This invention is directed to a method for completing a well and more particularly to a method for cementing pipe such as well casing against an evaporite section penetrated by the well.

In the completion of a well drilled into the earth, it is the usual practice to case the well. This is done by running casing or pipe into the well and pumping a cement slurry down the casing and up the annulus formed intermediate the outside of the pipe and the wall of the well and maintaining the cement slurry there to allow it to set and bond the pipe to the wall of the well.

Severe problems have occurred in cementing pipe against evaporite sections penetrated by a well. Evaporites or evaporite sections are formations formed in geological time by the evaporation of waters and deposition of minerals therefrom. Such formations include potassium and magnesium salts normally overlying sodium salts. It is thought that the problem of cementing against evaporites arises because the cement slurries used for bonding the pipe to the formation face do not bond to the potassium and magnesium salt sections of the evaporites. The result is that the evaporites are dissolved and sloughed into the well and degrade the cement slurry. This results in a cavity being formed in the evaporite section about the well and provides room for the evaporites to "plastic flow" and place a non-uniform load on the casing in the well which results in collapsing or deflecting the casing.

I have discovered a technique whereby pipe may be cemented against an evaporite section in a well having a water base drilling mud therein. In accordance with this technique, an oil-wetting liquid is flowed through the annular space formed about the pipe and the wall of the well to oil-wet the evaporite section. Thereafter, a densified, rapid setting cement slurry is positioned in the annular space adjacent the oil-wetted evaporite section and there maintained and allowed to set and bond the pipe to the oil-wetted evaporite section.

It is considered that the success of this technique for cementing against evaporites is due to the sum of several improvements offered by this technique. Basically, these improvements are due to: (1) oil wetting the evaporites by the oil-wetting liquid — this makes the evaporites less soluble and thus less likely to be damaged by the cement slurry; (2) decreasing the thickening time of the cement slurry — this shortens the time of contact of the slurry with the evaporites while the slurry is liquid and unset; (3) densifying the cement slurry — this makes it more resistant to contaminants and simultaneously lowers filter loss; and (4) lowering the filter loss of the cement slurry — to this decreases the attack by the sodium chloride saturated cement filtrate on the evaporites.

The oil-wetting liquid which is flowed through the annular space to oil-wet the evaporite section may be any type of oil base liquid which will oil-wet the evaporite sections. Examples of such oil-wetting liquids include: (1) a flush that is an oil-wetting oil-in-water emulsion, (2) an oil-wetting spacer, (3) any oil phase mud that is compatible with the cement slurry to be used, and (4) any sequence of two slugs of oil-wetting liquids where the flush is the first slug injected down the casing followed by a slug of either the oil-wetting spacer or the oil phase mud. The flush should be injected first because it is miscible with the water base mud in the well. The distinction considered here between a flush and a spacer is that a flush is a liquid that will not support in suspension a weighting agent whereas a spacer is a liquid that will support a weighting agent. Examples of suitable oil-wetting liquids are: oil-wetting mixtures or solutions emulsified in NaCl brine, full oil phase or inverted emulsion muds and oil phase spacers such as E Z Spot and SAM-4.

A particularly preferred oil-wetting liquid is one which is made up of two slugs, the first slug being an oil-wetting flush, brine preferably containing sufficient sodium chloride to provide a saturated salt solution at downhole conditions in the vicinity of the evaporite section, and containing an emulsified oil-wetting agent and the second slug being an oil base liquid material having oil as its external phase. The second slug may comprise, for example, a full oil phase or an inverted emulsion mud. The second slug may also be comprised of special liquid blends of emulsifiers, lubricants, gelatins, and other additives which are commercially available under the trade names of "E Z Spot" by Baroid Petroleum Services Division, NL Industries, Inc., and "SAM-4" spacer by Halliburton. Reference to E Z Spot is found in the COMPOSITE CATALOG OF OIL FIELD EQUIPMENT AND SERVICES, 1976–1977, published by World Oil at page 632, and reference to SAM-4 spacer is found at page 2909 thereof. Desirably, this second slug is weighted to a weight about halfway between the weight of the mud in the hole and the following cement slurry to provide good separation between the mud and the cement slurry. A satisfactory size of the two-slug spacer is 20 barrels of the first slug of brine containing an emulsified oil-wetting agent followed by 500 annular feet of the second oil slug. This size of spacer is sufficient to sweep residual mud from the hole and oil-wet the evaporite section.

In order to disperse the oil-wetting agent in the first brine slug, it is necessary to add an emulsifying agent to the brine. A preferred technique is to dissolve the oil-wetting agent in a light oil, such as diesel oil, and then emulsify this solution with a brine having therein an emulsifying agent.

Suitable oil-in-water emulsifying agents are those brine-soluble, nonionic compounds having surface action properties that are disclosed in U.S. Pat. No. 3,396,105 to Ralph F. Burdyn et al. and characterized by the formula

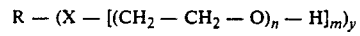

wherein R is a hydrophobic group containing at least four carbon atoms, X is a structural element selected from the group consisting of —O—, —S—,

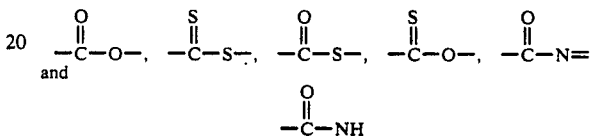

$(CH_2 — CH_2 —O)$ is ethylene oxide, $n$ is a whole number, H is hydrogen, $m$ is a whole number one less than the valence of the structural element X, $y$ is a whole number, and the product of $n$, $m$, and $y$ is at least as great as 10. Where $m$ is two, $n$ may be equal or unequal for each of the $(CH_2 — CH_2 — O)_n — H$ groups. It is preferred to employ a brine soluble, nonionic compound wherein y has a value of one. A preferred oil-in-water emulsifying agent is nonyl phenol ethoxylated with 30 moles of ethylene oxide, preferred because it is brine soluble to the extent required.

The oil-wetting agents, to be dissolved in the light oil prior to emulsifying the solution into the brine, used in carrying out this invention may be any suitable agents which are oil soluble and have the characteristics of oil wetting the surfaces of the hydratable materials employed in carrying out this invention. Examples of oil-wetting agents which may be employed in carrying out this invention are given in TABLE I by trade name, distributor and chemical composition. Also given in TABLE I are the density of the oil-wetting agent and practicable amounts of oil-wetting agents which may be used in pounds per barrel of the brine.

TABLE I

| Trade Name of Dispersant | Distributor | Chemical Composition | Density lb/gal | Practicable Amounts to Use lb/bbl. of brine |
|---|---|---|---|---|
| | Dispersant Description | | | |
| EZ Mul | Baroid | Half amide salt terminated | 8.1 | 5 |
| Driltreat | Baroid | Lecithin | 8.7 | 5 |
| Surf-Cote | Milchem | Oil-soluble amine dodecyl benzene sulfonate | 8.16 | 6 |
| SA-47 | Oil Base, Inc. | Aryl alkyl sodium sulfonate | 8.12 | 5 |
| Fazethin | Magcobar | | | 6 |
| Ken-Thin | Imco | Imidazolin | 7.9 | 7 |
| SE-11 | Magcobar | Modified alkyl aryl sulfonate plus imidazolin | 7.83 | 7 |
| Carbo-Mul | Milchem | Oil-soluble alkanol amide | 7.5 | 7 |

A suitable low filter loss weighted rapid setting cement slurry which may be pumped down the well and into the annular space intermediate the pipe in the well and the evaporite section immediately behind the oil-wetting preflush is a slurry formed of a hydraulic cement such as portland cement and which may also contain as additives therein material selected from the group consisting of pozzolan, silica flour and mixtures thereof, sodium chloride in an amount of at least 18 weight percent based on water and desirably in an amount to provide saturation of the mixing water, an ionization control agent in an amount up to about 1.5 weight percent based on cement, mixing water, and a weighting agent, such as barite or hematite, in an amount to provide a weighted cement slurry weighing within the range of about 15.8 to 21 pounds per gallon. There may also be included in the slurry d-glucono delta lactone as a dispersing agent in an amount within the range of about 0.01 to 0.5 weight percent based on cement, which allows the amount of cement to water ratio to be increased thereby densifying the slurry and aiding in lowering its filter loss. A suitable ionization control agent is a cellulose ether available from Dyckerhoff Zementwerke Aktiengesellschaft, Wiesbaden, Germany, under the trade name of Halad D. Another cement slurry which may be used in accordance with this invention is one formed of hydraulic cement, such as portland Class G or Class G, plus a material selected from the group consisting of pozzolan, silica flour and mixtures thereof, 37.3 weight percent sodium chloride based on water, 0.6 weight percent of a cellulose ether based on cement, 0.1 weight percent d-glucono delta lactone based on cement, water, and a weighting agent to provide a weighted, densified cement weighing up to 16.8 pounds per gallon. The pozzolan and silica flour are materials that have no cementitious properties themselves but which will react with lime released by cement to form cementitious material.

In accordance with an embodiment of this invention, a pumpable cement slurry is formed that is comprised of hydraulic cement, material selected from the group consisting of pozzolan, silica flour and mixtures thereof, ionization control agent, sodium chloride, weighting agent, dispersing and retarding agent, and water, which slurry has a density within the range of about 15.8 to 21.0 pounds per gallon. This slurry is circulated down the well following the oil-wetting liquid and is positioned in the annular space formed intermediate the pipe and the wall of the well and maintained there to allow the slurry to set and bond the pipe to the wall of the well. Preferably in the formulation of the cement slurry, Class G portland cement is used and silica flour is present in an amount within the range of 30 to 40 weight percent or pozzolan may be used in place of silica flour in which case the pozzolan is present in an amount within the range of 25 to 50 weight percent, ionization control agent in an amount within the range of 0.3 to 1.0 weight percent, dispersing and retarding agent in an amount within the range of 0.05 to 0.20 weight percent, all based on the weight of cement, and weighting agent is present in a sufficient amount to provide a density of the cement slurry within the range of 15.8 to 21.0 pounds per gallon and sodium chloride is present in an amount of at least 18 weight percent based on mixing water. The preferred dispersing and retarding agent is d-glucono delta lactone which is available under the trade name of CFR-1 from Halliburton Services and is described in the COMPOSITE CATALOG OF OIL FIELD EQUIPMENT AND SERVICES, 1976-1977, v. 2, p. 2910. Hematite is the preferred weighting agent and is preferred because of its high density.

Attapulgite is not affected by evaporites. Therefore, if a lighter cement is desirable, then attapulgite may be included in the cement slurry to lower the cement slurry density to about 13 pounds per gallon and to extend the cement.

In accordance with a preferred embodiment, the cement slurry used for cementing pipe against the evaporites has a composition of Class G portland cement, 35 weight percent silica flour based on cement, 0.6 weight percent ionization control agent based on cement, 37.2 weight percent sodium chloride based on water, 31.9 weight percent hematite based on cement, 0.1 weight percent d-glucono delta lactone based on cement mixed in 6.5 gallons of fresh water per 94 pounds of cement to weigh 17.2 pounds per gallon and yield 1.80 cubic feet per 94 pounds of cement.

This last described slurry was tested to determine the effects that magnesium chloride contamination would have upon it. The plastic viscosity and yield point of the slurry were determined and the slurry was then brought to 170° F. (77° C.) using a Halliburton consistometer. At this point, 5 volume percent of a 20 weight percent solution of magnesium chloride ($MgCl_2$) was added and the plastic viscosity and yield point of the slurry again determined. Before adding 5 weight percent of the 20 percent $MgCl_2$ solution, the slurry had a plastic viscosity of 39 centipoises (cp), a yield point of 31 pounds per 100 square feet (lb/100 sq. ft.), and an initial gel of 15 lb/100 sq. ft. After adding the $MgCl_2$ solution, the slurry had a plastic viscosity of 37, a yield point of 45, and an initial gel of 32 showing superior resistance to $MgCl_2$. At 212° F. in 24 hours the slurry set and developed 881 pounds per square inch (psi) of compressive strength.

It is considered that general slurries of the type described are stable to $MgCl_2$ contamination because they contain the following components not affected by $MgCl_2$ when first mixed. These are silica, hematite, and d-glucono delta lactone. At elevated temperatures, the silica reacts with the lime released when the cement sets to form a cementitious material which also sets, but does not form until the cement is in place. The d-glucono delta lactone performs as a dispersant and retarder, both in the presence of sodium chloride (NaCl) and $MgCl_2$. The ionization control agent prevents $MgCl_2$ from ionizing and releasing $Mg^{++}$ ion which attacks the cement. The weight of this general slurry can be varied from 15.8 to 21.0 lb/gal. by selecting the amount of hematite used. Its rheological properties may be adjusted so that it flows well and does not separate water by varying the concentration of water, dispersant and ionization control agent, and the thickening time and rheological properties can be controlled by varying the concentration of the dispersant and retarder. This general slurry is considered ideal for cementing against evaporites over a temperature range of 150°-350° F. (66°-177° C.).

The problem that occurs in cementing pipe against evaporite sections containing magnesium ions results because magnesium ions react with the hydraulic cement of the slurry (active solids) to rapidly and greatly increase the viscosity of the slurry to the point that it can no longer be pumped. The slurry of this invention is designed to combat this problem by diluting the hydraulic cement content of the slurry with inactive solids to the point that the magnesium ions may react with the diluted hydraulic cement without creating an unpumpable slurry while providing, however, a sufficient amount of hydraulic cement to set and develop adequate compressive strength. The dilution of the hydraulic cement is brought about by the inclusion of silica flour or pozzolan which is inert to magnesium ions and has a mixing water requirement. Thus, in mixing this composition with water to obtain a pumpable slurry, larger amounts of water are required to compensate for the presence of the silica flour or pozzolan. The water is the principal diluting agent. Evaporite sections contain massive amounts of sodium chloride as well as magnesium and potassium salts. Thus, the inclusion of sodium chloride in the cement slurry in an amount of at least 18 percent allows the cement slurry to bond against the sodium chloride portion of the evaporite. Weighting agent is included in the cement slurry to obtain a cement slurry density sufficient to control the well and to provide a slurry density of about 1 pound per gallon greater than the density of the mud in the well and thus provide for efficient displacement of the slurry down the well and up the annulus surrounding the pipe. A dispersing agent which is compatible with all encountered concentrations of sodium chloride and magnesium salts is provided in this slurry to adjust the yield point and gel strength of the slurry such that the solids, in particular the weighting agent, are suspended in the slurry. The slurry must be retarded to prevent the premature setting thereof. The silica flour or pozzolan used in this slurry serve a dual purpose. It provides for added dilution water and reacts at formation temperatures with the lime released when the hydraulic cement sets to form a cementitious material which provides additional compressive strength to the set slurry.

What is claimed is:

1. In the drilling of a well with a water base drilling mud, a method of cementing pipe against an evaporite section penetrated by said well, comprising the steps of:
   (a) flowing an oil-wetting liquid through the annular space formed intermediate said pipe and the wall of said well to oil-wet said evaporite section;
   (b) forming a pumpable cement slurry comprised of hydraulic cement, sodium chloride in an amount of at least about 18 weight percent based on mixing water, an ionization control agent in an amount up to 1.5 weight percent based on cement, mixing water and weighting agent in an amount to provide a density of said cement slurry within the range of about 15.8 to 21 pounds per gallon;
   (c) positioning said slurry in the annular space formed intermediate said pipe and said evaporite section; and
   (d) maintaining said slurry in said annular space to allow said slurry to set and bond said pipe to said evaporite section.

2. The method of claim 1 wherein said cement slurry further includes d-glucono delta lactone in an amount within the range of 0.01 to 0.5 weight percent based on cement.

3. The method of claim 2 wherein said ionization control agent is a cellulose ether.

4. The method of claim 3 wherein said oil-wetting liquid is comprised of a slug of saturated salt water containing an emulsified oil-wetting agent, and a second slug of an oil base liquid material having oil as the external phase, said second slug being weighted halfway between the weight of said drilling mud and the following cement slurry.

5. The method of claim 4 wherein said weighting agent is hematite.

6. The method of claim 5 wherein said sodium chloride is present in said oil-wetting liquid in an amount to provide saturation at well conditions in the vicinity of said evaporite section.

7. The method of claim 6 wherein said sodium chloride is present in said cement slurry in an amount of about 18 weight percent based on mixing water at surface conditions.

8. In a method of cementing pipe in a well against an evaporite section penetrated by said well, the improvement comprising:
   (a) flowing a slug of an oil-wetting liquid through the annular space formed intermediate said pipe and the wall of said well to oil-wet said evaporite section;
   (b) forming a pumpable cement slurry comprised of hydraulic cement, material selected from the group consisting of silica flour, pozzolan and mixtures thereof in an amount within the range of 30 to 50 percent based on cement, sodium chloride in an amount of at least 18 weight percent based on mixing water, a dispersing and retarding agent in an amount within the range of 0.01 to 0.5 percent based on cement, hematite in an amount to provide a slurry density within the range of 15.8 to 21 pounds per gallon, and water;
   (c) positioning said pumpable slurry in the annular space formed intermediate said pipe and said evaporite section; and
   (d) maintaining said slurry in said annular space to allow said slurry to set and bond said pipe to said evaporite section.

9. The method of claim 8 wherein said pumpable aqueous cement slurry is comprised of Class G portland cement, 35 weight percent silica flour, 37.2 weight percent sodium chloride based on water, 31.9 weight percent hematite, and 0.1 percent d-glucono delta lactone, and mixed with 6.5 gallons of fresh water per 94-pound sack of said cement to yield a pumpable slurry having a density of 17.2 pounds per gallon.

10. In the drilling of a well with a water base drilling mud, a method of cementing pipe against an evaporite section penetrated by said well, comprising the steps of:
   (a) forming an oil-wetting liquid comprised of a first brine slug containing an emulsified oil-wetting agent and a second oil-phase slug, said first brine slug being formed by dissloving said oil-wetting agent in a light oil and emulsifying with a brine solution having an emulsifying agent therein;
   (b) flowing said oil-wetting liquid through the annular space formed intermediate said pipe and the wall of said well to oil-wet said evaporite section;
   (c) forming a pumpable cement slurry comprised of hydraulic cement, sodium chloride in an amount of at least about 18 weight percent based on mixing water, an ionization control agent in an amount up to 1.5 weight percent based on cement, mixing water and weighting agent in an amount to provide a density of said cement slurry within the range of about 15.8 to 21 pounds per gallon;
   (d) positioning said slurry in the annular space formed intermediate said pipe and said evaporite section; and
   (e) maintaining said slurry in said annular space to allow said slurry to set and bond said pipe to said evaporite section.

* * * * *